United States Patent [19]

Krupic et al.

[11] Patent Number: 5,169,049
[45] Date of Patent: Dec. 8, 1992

[54] GRANULATED MATERIAL SHAKER

[76] Inventors: Eric J. Krupic, 5815 Commerce Rd., West Bloomfield, Mich. 48324; Russell A. Vogt, 6091 Cochise, West Bloomfield, Mich. 48322

[21] Appl. No.: 749,965

[22] Filed: Aug. 26, 1991

[51] Int. Cl.$^5$ .............................. G01F 11/26
[52] U.S. Cl. ..................... 227/456; 222/457.5
[58] Field of Search ............... 222/142.1, 142.5, 454, 222/456, 457.5, 480, 565

[56] References Cited

U.S. PATENT DOCUMENTS

| | | | |
|---|---|---|---|
| 1,084,530 | 1/1914 | Bettman | 222/456 |
| 1,270,262 | 6/1918 | Buckland | 222/456 X |
| 1,707,967 | 4/1929 | Abbott | 222/456 X |
| 1,763,449 | 6/1930 | Trautvetter | 222/456 |
| 1,877,808 | 9/1932 | Cagliostro | 222/456 |
| 2,423,784 | 7/1947 | Mackey | 222/456 |
| 2,644,616 | 7/1953 | Gordon | 222/457.5 X |
| 2,704,623 | 3/1955 | Yasso | 222/456 |
| 3,172,580 | 3/1965 | Mackey | 222/456 |
| 3,323,683 | 6/1967 | Cianciolo | 222/480 |
| 4,424,921 | 1/1984 | Feuerstein et al. | 222/456 |
| 4,961,521 | 10/1990 | Eckman | 222/456 X |

FOREIGN PATENT DOCUMENTS 679092  7/1939  Fed. Rep. of Germany ... 222/457.5
241074 10/1925  United Kingdom ................ 222/456

Primary Examiner—Andres Kashnikow
Assistant Examiner—Kenneth Bomberg
Attorney, Agent, or Firm—Alex Rhodes

[57] ABSTRACT

A shaker for sprinkling a preset amount of a granulated material, such as table salt, having a removable closure with a plurality of small apertures, an upper discharge chamber below the closure for receiving a granulated material from a measuring chamber in a lower portion of the shaker and an intermediate chamber between the upper discharge chamber and lower measuring chamber for storing granulated material. The intermediate chamber has a plurality of small apertures for filling the measuring chamber with a preset amount of granulated material from the intermediate chamber. A delivery tube extends upwardly from the lower measuring chamber to the discharge chamber for emptying the measuring lower chamber of the preset amount of granulated material when the shaker is inverted. The upper portion of the measuring chamber forms a shake-back guard to prevent additional granulated material from entering the measuring chamber when the shaker is inverted and shaken to sprinkle the material from the shaker.

5 Claims, 2 Drawing Sheets

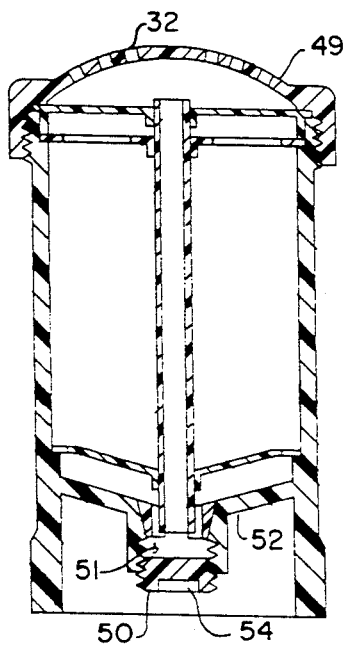
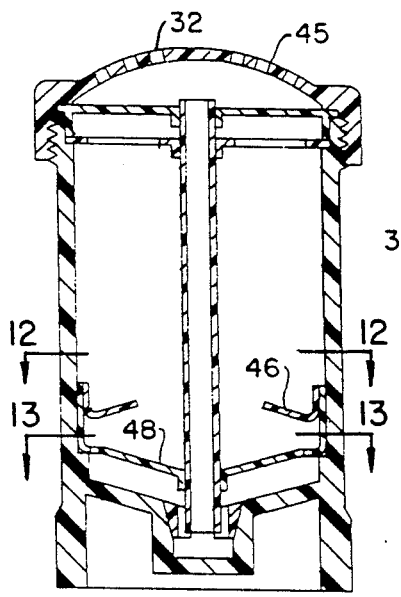
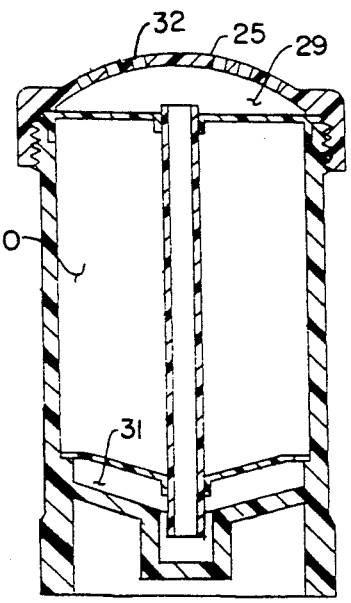
FIG.14　　　　　FIG.11　　　　　FIG.10
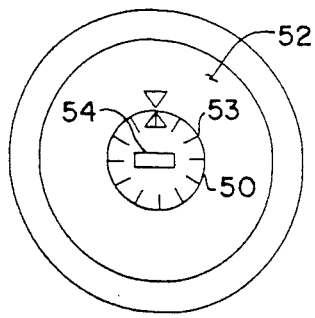
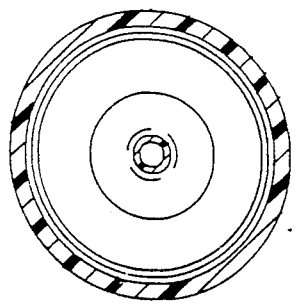
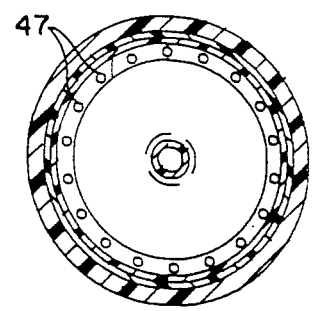
FIG.15　　　　　FIG.12　　　　　FIG.13

5,169,049

GRANULATED MATERIAL SHAKER

BACKGROUND OF THE INVENTION

This invention relates to containers and more particularly to a shaker for sprinkling a preset amount of a granulated material, such as salt, spices and the like.

Shakers are commonly used for sprinkling granulated materials, such as salt and spices, to flavor foods such as soups, salads, meats, and the like. During the dispensing of the granulated materials, excess amounts are often discharged. In such instances, excessive flavoring is added and medically restricted diets are violated. The intake of excess salt by persons with heart ailments can produce serious physical consequences.

Numerous examples exist in the prior art of containers for dispensing preset amounts of granulated sugar through a single central opening by merely inverting the containers. Bettman U.S. Pat. No. 1,084,530; Buckland U.S. Pat. No. 1,270,262; Cagliostro U.S. Pat. No. 1,877,808; Mackey U.S. Pat. No. 3,172,580; Feuerstein et al U.S. Pat. No. 4,424,921; and Eckman U.S. Pat. No. 4,961,521 are exemplary of the prior art. They generally comprise containers having two chambers, namely a calibrated lower chamber and an upper storage chamber. A delivery tube extends from the calibrated chamber vertically upward to discharge the preset amount of granulated sugar through a single outlet from the container. There are no provisions in the containers for preventing a discharge of excess material if the containers are inverted and shaken.

Eckman U.S. Pat. No. 4,961,521 discloses a dispenser which is capable of sprinkling a preset amount of a granulated material such as salt and spices. Excess material is prevented from being discharged from the container by rotating a cap to close off a metering chamber before the container is inverted to sprinkle a preset amount from the container. Although Eckman accomplishes this end, Eckman fails when the cap is not rotated by a user.

Clearly, there is a need for an effective and reliable container for sprinkling a preset amount of granulated material such as salt or spices.

SUMMARY OF THE INVENTION

The present invention satisfies the foregoing need by providing a container which, without any act on the part of a user, allows only a preset amount of material to be sprinkled from the container. The invention resides in providing three chambers, namely, an upper discharge chamber, an intermediate storage chamber and a lower calibrated measuring chamber. The invention further provides a shake-back guard to ensure that only a preset amount of granulated material will be dispensed when the shaker is inverted and shaken. The measuring chamber is comprised of a narrow conical passageway which extends from an outer wall of the container inwardly and downwardly to a depression in the center of the bottom wall of the shaker. At the outer perimeter of the bottom of the storage chamber there is a plurality of small apertures which allow granulated material to flow from the storage chamber through the narrow passageway into the calibrated measuring chamber.

In the center of the shaker there is a delivery tube which communicates with the lower measuring chamber and upper discharge chamber. When the container is inverted and shaken, the granulated material in the measuring chamber flows through the delivery tube into the discharge chamber and is sprinkled out of the small apertures of the closure. The small apertures of the storage chamber, their distance from the delivery tube and the outward and downward sloping narrow passageway co-act to prevent excess material from being discharged from the inverted shaker.

Further features, benefits and objects of the invention will become apparent from the ensuing detailed description and accompanying drawings which describe the invention in detail. The subject matter in which exclusive property rights ar claimed is set forth in each of the numbered claims at the conclusion of the detailed description.

BRIEF DESCRIPTION OF THE DRAWINGS

FIG. 7 is a cross-sectional view taken on the line 7—7 of FIG. 4.

FIG. 10 is a cross-sectional view similar to FIG. 4 of an alternate embodiment of the present invention FIG. 11 is a cross-sectional view similar to FIG. 4 of a second alternate embodiment of the present invention.

FIG. 12 is a cross-sectional view taken on the line 12—12 of FIG. 11.

FIG. 13 is a cross-sectional view taken on the line 13—13 of FIG. 11.

FIG. 14 is a cross-sectional view similar to FIG. 4 of a third alternate embodiment of the present invention.

FIG. 15 is a bottom view of the preferred embodiment shown in FIG. 14.

DETAILED DESCRIPTION OF THE PREFERRED EMBODIMENT

Figure 5:
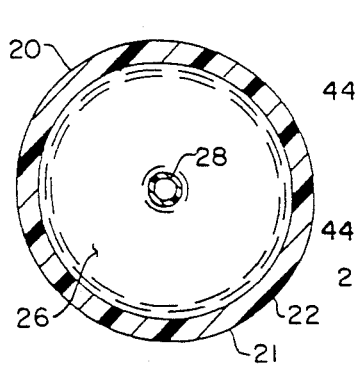
FIG. 5 is a cross-sectional view taken on the line 5—5 of FIG. 4.
Figure 6:
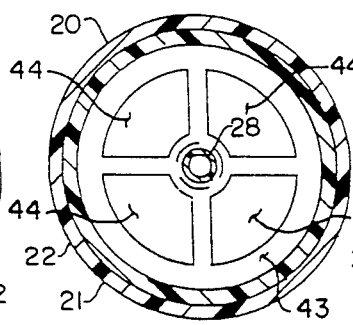
FIG. 6 is a cross-sectional view taken on the line 6—6 of FIG. 4.
Figure 1:
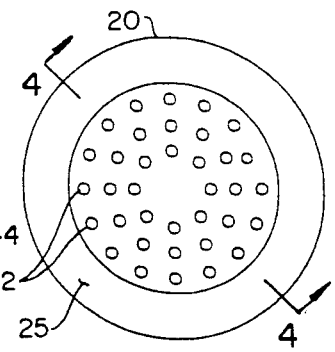
FIG. 1 is a plan view of a preferred embodiment of the present invention.

Referring now to the drawings, wherein like numerals designate like and corresponding parts throughout the several views, a granulated material shaker 20 is shown in FIGS. 1-9, inclusive, which embodies our invention. The embodiment 20 illustrated therein is comprised of a cylindrical container 21 having a sidewall 22, a bottom wall 23 and an open top 24; a removable closure 25 for covering the open top 24; a removable upper partition 26; a lower partition 27 and a delivery tube 28. The upper 26 and lower 27 partitions divide the container into three chambers, namely, an upper discharge chamber 29, an intermediate storage chamber 30 and a lower calibrated measuring chamber 31.

Figure 4:
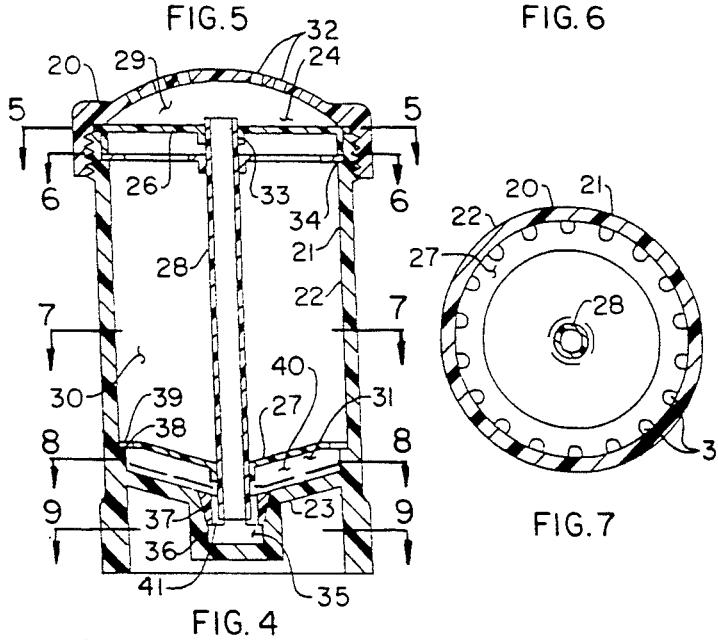
FIG. 4 is a cross-sectional view taken on the line 4—4 of FIG. 2.
Figure 2:
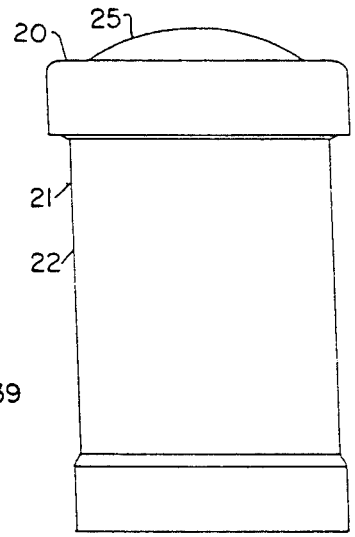
FIG. 2 is a side view of the preferred embodiment.
Figure 8:
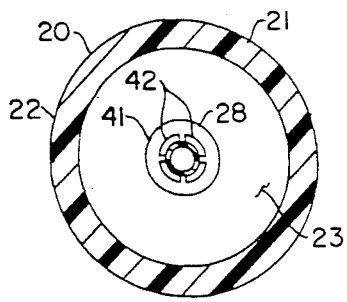
FIG. 8 is a cross-sectional view taken on the line 8—8 of FIG. 4.
Figure 9:
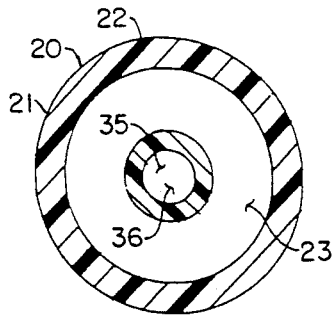
FIG. 9 is a cross-sectional view taken on the line 9—9 of FIG. 4.
Figure 3:
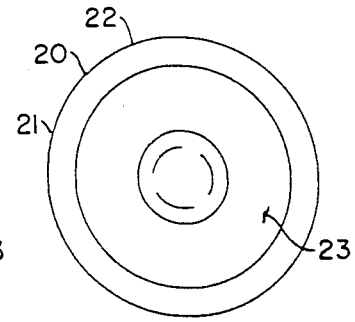
FIG. 3 is a bottom view of the preferred embodiment.

The construction of the shaker 20 is best understood by reference to FIG. 4. The closure 25 threadably engages the upper portion of the container 21 and has a plurality of small apertures 32 for sprinkling a preset amount of granulated material from the upper discharge chamber 29. As will be noted in FIG. 1, the apertures 32 are spaced away from the delivery tube 28 which is centered in the closure 25. The upper discharge chamber 29 which is directly below the closure 25 is formed by the closure 25, sidewall 22, and upper partition 26. The upper partition 26 is a thin disk which extends across the interior of the container 21. In the center of the partition 26 there is an aperture 33 which closely fits the delivery tube 28. The partition 26 rests on a shoulder 34 and is removable for adding granulated material.

In the center of the bottom wall 23 of the container 21 there is a cavity 35. The cavity 35 has a cylindrical lower portion 36 and a tapered upper portion 37. The bottom wall 23 tapers inwardly and downwardly from the sidewall 22 to the cavity 35. The lower partition 27, a thin disk directly above the bottom wall 23, is disposed in close parallel relationship to the bottom wall 23. The lower partition 27 rests on a shoulder 38 of the container 21 and extends from the sidewall 22 to the lower portion of the delivery tube 28. The delivery tube 28 passes through the lower partition 27 and is preferably fixed to the lower partition 27. Extending around the periphery of the lower partition 27 there is a plurality of small notches 39 which allow granulated material to flow from the intermediate storage chamber 30 through the narrow conical passageway 40, formed by bottom wall 23 and the lower partition 27, into the cavity 35 of the bottom wall 23.

As illustrated in FIG. 4, the lower partition 27, sidewall 22 and bottom wall 23 form the calibrated measuring chamber 31 of which the cavity 35 constitutes a part for segregating a preset amount of the granulated material. Moreover, the upper partition 26, lower partition 27 and sidewall 22 form the intermediate chamber 30 for storing the granulated material.

A tapered plug 41 is fixedly attached to the lower end of the delivery tube 28 and is seated in the tapered portion 37 of the cavity 35 of the bottom wall 23. In the outer portion of the plug 41 are several recesses 42 for allowing the granulated material to fill the cavity 35 of the bottom wall 23. The delivery tube 28 extends vertically upwardly from the calibrated measuring chamber 31, through the intermediate chamber 30 and into the discharge chamber 29. In the interior of the intermediate storage chamber 30 there is a centering disk 43 with apertures 44 for centering the delivery tube 28 when the upper partition 26 is not in place during the filling of the shaker 20.

The method of using the shaker is as follows. The closure 25 and upper partition 26 are removed and the intermediate storage chamber 30 is filled to the level of the shoulder 34 which supports the upper partition 26. After filling, some of the granulated material flows past the notches 39 of the lower partition 27 and conical passageway 40 to fill the calibrated measuring chamber 31. When it is desired to dispense the preset amount of the granulated material of the measuring chamber 31, the shaker 20 is inverted and shaken. In the inverted position, a very small amount of material flows back through the notches 39 to the intermediate chamber 30. The remainder of the granulated material in the cavity 35 of the measuring chamber 31 flows through the delivery tube 28 into the discharge chamber 29. As the shaker 20 is shaken, the granulated material in the discharge chamber 29 is sprinkled through the small apertures 32 of the closure 25.

It will be noted that in an inverted position, the lower partition 27 slopes outwardly and downwardly to the sidewall 22. The downward slope of the lower partition 27 prevents additional granulated material form flowing into the delivery tube 28. Thus, the lower partition 27 in the inverted position serves as a shake-back guard and cooperates with the small notches 39 and the large distance of the notches 39 from the delivery tube 28 to inhibit a discharge of excess material.

In FIG. 10, an embodiment 44 is shown wherein the tapered plug 41 at the bottom of the delivery tube 28 and centering disk 43 are not used. Although the tapered plug 41 and centering disk 43 are preferable, we have shown this embodiment 44 to illustrate that these elements are not mandatory for practicing our invention.

With reference now to FIGS. 11 though 13, inclusive, a third embodiment 45 is shown which further comprises a second shake-back guard 46. The second shake-back guard 46 is a thin annular member which extends upwardly and inwardly from the sidewall 22 of the container. It is positioned slightly above and overlies apertures 47 in the lower partition 48, and further impedes excess granulated material from entering the delivery tube 28 when the shaker is inverted and shaken. In FIGS. 14 and 15, an embodiment 49 is shown wherein the preset amount of the granulated material can be selectively adjusted by advancing or retracting a plug 50 which threadably engages the cavity 51 of the bottom wall 52. On the exterior of the plug 50, indicia 53 are provided which indicate the preset amount of the granulated material. The plug 50 has a slot 54 for a screw driver (not shown) to advance and retract the adjusting plug 50 in and out of the cavity 51.

From the foregoing it will be appreciated that our invention provides an efficient and easy to use means for sprinkling a preset amount of granulated material. Although several embodiments have been illustrated and disclosed herein, it is not our intention to limit our invention to these embodiments. It will be understood that obvious changes can be made in the size, material, shape and arrangement of parts without departing from the spirit thereof.

We claim:

1. A shaker for sprinkling a preset amount of granulated material such a table salt comprising: a container for storing granulated material, said container having a sidewall, a bottom wall, and an open top, said bottom wall tapering inwardly and downwardly from said sidewall to a cavity protruding from the center of said bottom wall; a removable closure at the upper end of said container for covering said open top, said closure having a plurality of small apertures; a removable upper partition spaced a short distance below said closure, said upper partition and closure forming an upper discharge chamber for receiving a preset amount of the granulated material form a measuring chamber in the lower end portion of said container; a lower partition spaced a short distance above said bottom wall, said lower partition having a plurality of small apertures for filling said lower chamber with the granulated material stored in an intermediate chamber bounded by said upper partition, said lower partition and said sidewall, said lower partition coacting with said sidewall and bottom wall to form said measuring chamber with the cavity for holding the preset amount of the granulated material, and said lower partition tapering inwardly and downwardly from said sidewall whereby said lower partition tapers upwardly and inwardly form said sidewall when said shaker is inverted and shaken, said lower partition small aperture size and said lower partition taper cooperating to prevent additional granulated material from entering said measuring chamber when said shaker is inverted and shaken; and a delivery tube extending between said lower and said upper chambers for emptying said cavity in said lower chamber of said preset amount of the granulated material into said upper chamber when said shaker is inverted.

2. The shaker recited in claim 1 further comprising a guard for preventing additional granulated material from entering said measuring chamber when said shaker is inverted and shaken, said guard comprising a thin member spaced above said lower partition, said guard extending inwardly and upwardly to overlie said apertures of said lower partition when said shaker is in said inverted position.

3. A shaker for sprinkling a preset amount of granulated material such as table salt comprising: a removable closure at an upper end of said shaker with a plurality of small apertures for sprinkling a preset amount of granulated material; an upper discharge chamber below said closure for receiving the preset amount of the granulated material from a cavity protruding from a lower measuring chamber in a lower portion of said shaker; an intermediate chamber below said discharge chamber and above said lower measuring chamber for storing the granulated material, said intermediate chamber having a plurality of small apertures for filling said measuring chamber with the preset amount of the granulated material; said plurality of small apertures being located adjacent to a periphery of a lower partition tapering upwardly and inwardly from a sidewall when said shaker is inverted and shaken, said intermediate chamber also having a shake-back guard spaced above said plurality of small apertures, extending inwardly and upwardly from a sidewall of said intermediate chamber and overlying said plurality of small apertures in said intermediate chamber, said shake-back guard having an aperture in the center thereof; said tapering lower portion and said small aperture size cooperating to prevent additional granulated material from entering said measuring chamber when said shaker is inverted and shaken and a means for emptying said cavity protruding from said lower measuring chamber of said preset amount of the granulated material into said upper chamber when said shaker is inverted.

4. A shaker for sprinkling a preset amount of granulated material such as table salt comprising: a container for storing granulated material, said container having a sidewall, a bottom wall and an open top, said bottom wall tapering downwardly and inwardly from said sidewall and having a small cavity protruding from the center thereof for holding a preset amount of said granulated material, said cavity having a cylindrical lower portion and a tapered upper portion; a removable closure at the upper end of said container for covering said open top, said closure having a plurality of small apertures for sprinkling the preset amount of the granulated material from a discharge chamber below said closure; a removable upper partition spaced a short distance below said closure, said upper partition and closure forming the upper discharge chamber for receiving the preset amount of the granulated material from a measuring chamber in a lower end portion of said container; a lower partition spaced a short distance above said bottom wall, said lower partition being in substantially parallel relationship to said tapered portion of said bottom wall and forming with said sidewall and said bottom wall the measuring chamber with the cavity therein for holding the preset amount of said granulated material, said lower partition having a plurality of small apertures for filling said lower measuring chamber with the granulated material stored in an intermediate chamber formed by said sidewall and said upper and said lower partitions said lower partition small aperture size and said lower portion relationship with the bottom wall cooperating to prevent additional granulated material from entering said measuring chamber when said shaker is inverted and shaken; and a delivery tube centrally disposed in said shaker and extending between said measuring and said discharge chambers for emptying said cavity of the measuring chamber of said preset amount of the granulated material into said upper chamber when said shaker is inverted.

5. The shaker recited in claim 4 further comprising a means in said intermediate storage chamber for centering the upper portion of said delivery tube in said shaker.

* * * * *

UNITED STATES PATENT AND TRADEMARK OFFICE
CERTIFICATE OF CORRECTION

PATENT NO. : 5,169,049
DATED : December 8, 1992
INVENTOR(S) : Eric J. Krupic and Russell A. Vogt It is certified that error appears in the above-identified patent and that said Letters Patent is hereby corrected as shown below:

```
Column 2, line 11, change "ar" to --are--.
Column 3, line 67, change "form" to --from--.
```

In the Claims:
```
Column 4, line 52, change "form" to --from--.
Column 4, line 64, change "form" to --from--.
```

Signed and Sealed this

Nineteenth Day of October, 1993

Attest:

BRUCE LEHMAN

*Attesting Officer*  *Commissioner of Patents and Trademarks*